US 9,104,988 B2

(12) United States Patent
Drew et al.

(10) Patent No.: US 9,104,988 B2
(45) Date of Patent: Aug. 11, 2015

(54) SYSTEM AND METHOD FOR PROVIDING FACILITIES MANAGEMENT BASED ON WEATHER VULNERABILITY

(75) Inventors: James H. Drew, Sugar Hill, NH (US); Rina R. Schneur, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1931 days.

(21) Appl. No.: 11/950,164

(22) Filed: Dec. 4, 2007

(65) Prior Publication Data

US 2009/0144115 A1    Jun. 4, 2009

(51) Int. Cl.
*G06Q 10/00* (2012.01)
*G06Q 10/06* (2012.01)

(52) U.S. Cl.
CPC ............ *G06Q 10/06* (2013.01); *G06Q 10/0631* (2013.01); *G06Q 10/06311* (2013.01)

(58) Field of Classification Search
USPC ........ 705/1.1, 7.11–7.42; 379/1.01–15.05, 22
See application file for complete search history.

(56) References Cited

U.S. PATENT DOCUMENTS

| | | | | |
|---|---|---|---|---|
| 5,488,715 | A | * | 1/1996 | Wainwright .................... 714/4.3 |
| 5,684,872 | A | * | 11/1997 | Flockhart et al. ........ 379/266.08 |
| 5,687,212 | A | * | 11/1997 | Kinser et al. ................. 379/9.03 |
| 5,699,403 | A | * | 12/1997 | Ronnen ....................... 379/15.04 |
| 5,790,633 | A | * | 8/1998 | Kinser et al. ................. 379/9.02 |
| 5,790,634 | A | * | 8/1998 | Kinser et al. ............... 379/29.01 |
| 5,848,073 | A | * | 12/1998 | Abdelmonem et al. ...... 714/704 |
| 5,953,389 | A | * | 9/1999 | Pruett et al. ....................... 379/9 |
| 6,026,144 | A | * | 2/2000 | Bernstein et al. ............ 379/9.02 |
| 6,353,902 | B1 | * | 3/2002 | Kulatunge et al. ............ 714/712 |
| 6,446,123 | B1 | * | 9/2002 | Ballantine et al. ............ 709/224 |
| 6,577,711 | B1 | * | 6/2003 | Williamson et al. ........ 379/22.03 |
| 6,578,005 | B1 | * | 6/2003 | Lesaint et al. ..................... 705/8 |
| 6,614,882 | B1 | * | 9/2003 | Beamon et al. ............ 379/27.01 |
| 6,771,739 | B1 | * | 8/2004 | Beamon et al. .............. 379/9.03 |
| 6,845,148 | B1 | * | 1/2005 | Beamon ...................... 379/9.02 |
| 6,870,900 | B1 | * | 3/2005 | Beamon ...................... 379/9.03 |
| 6,912,221 | B1 | * | 6/2005 | Zadikian et al. ......... 370/395.21 |
| 6,937,993 | B1 | * | 8/2005 | Gabbita et al. ..................... 705/8 |
| 6,961,415 | B2 | * | 11/2005 | Doherty et al. ........... 379/201.12 |
| 7,174,152 | B1 | * | 2/2007 | Oleniczak et al. .......... 455/404.1 |
| 7,249,030 | B2 | * | 7/2007 | Sopko et al. .................. 705/305 |
| 7,272,516 | B2 | * | 9/2007 | Wang et al. ..................... 702/60 |
| 7,289,605 | B1 | * | 10/2007 | Jean et al. .................. 379/32.01 |
| 7,292,677 | B2 | * | 11/2007 | Beamon ...................... 379/9.03 |
| 7,369,968 | B2 | * | 5/2008 | Johnson et al. ............... 702/188 |
| 7,403,939 | B1 | * | 7/2008 | Virdy ............................ 707/718 |

(Continued)

OTHER PUBLICATIONS

"Prioritization procedure for transmission network assets revitalization" (Majstrovic, D. Bajs; Medic, I.; Modern Electric Power, 2006—eihp.hr).*

(Continued)

*Primary Examiner* — Alan S Miller (57) ABSTRACT

An approach is provided for managing facilities (e.g., wire centers) based on weather vulnerability analysis. Data representing trouble tickets associated with a plurality of facilities is received. Weather information relating to the facilities is received. A determination is made of the vulnerability of the facilities to weather based on the data and the weather information. The facilities are prioritized based on the determined vulnerability. Preventative maintenance activities (as well as financial forecasts) can be performed for one or more of the facilities based on the prioritization of the facilities.

21 Claims, 6 Drawing Sheets

(56) References Cited

U.S. PATENT DOCUMENTS

| | | | |
|---|---|---|---|
| 7,428,300 B1* | 9/2008 | Drew et al. | 379/29.09 |
| 7,447,509 B2* | 11/2008 | Cossins et al. | 455/457 |
| 7,506,001 B2* | 3/2009 | Johnson et al. | 1/1 |
| 7,551,724 B2* | 6/2009 | Beamon | 379/9.02 |
| 7,558,703 B2* | 7/2009 | Stoupis et al. | 702/183 |
| 7,567,652 B2* | 7/2009 | Beamon | 379/9.03 |
| 7,593,833 B2* | 9/2009 | Savoor et al. | 702/186 |
| 7,647,391 B1* | 1/2010 | Jean et al. | 709/223 |
| 7,742,576 B2* | 6/2010 | Jean et al. | 379/9.03 |
| 7,844,568 B2* | 11/2010 | Fein et al. | 706/62 |
| 2001/0037229 A1* | 11/2001 | Jacobs et al. | 705/8 |
| 2002/0111755 A1* | 8/2002 | Valadarsky et al. | 702/58 |
| 2002/0123983 A1* | 9/2002 | Riley et al. | 707/1 |
| 2003/0004598 A1* | 1/2003 | Morris | 700/116 |
| 2003/0004780 A1* | 1/2003 | Smith et al. | 705/10 |
| 2004/0153437 A1* | 8/2004 | Buchan | 707/1 |
| 2004/0158360 A1* | 8/2004 | Garland et al. | 700/286 |
| 2004/0167731 A1* | 8/2004 | Wang et al. | 702/60 |
| 2004/0260668 A1* | 12/2004 | Bradford | 707/1 |
| 2005/0097396 A1* | 5/2005 | Wood | 714/25 |
| 2006/0230309 A1* | 10/2006 | Kromer et al. | 714/11 |
| 2006/0242288 A1* | 10/2006 | Masurkar | 709/223 |
| 2007/0041316 A1* | 2/2007 | Chaudhuri | 370/218 |
| 2007/0208537 A1* | 9/2007 | Savoor et al. | 702/182 |
| 2008/0031423 A1* | 2/2008 | Beamon | 379/9 |
| 2008/0253533 A1* | 10/2008 | Beamon | 379/9.02 |

OTHER PUBLICATIONS

"Integrated Network Operations Architecture and its Application to Network Maintenance" (W. H. Cameron, C LaCerte, J. F. Noyes; Aug. 1987—vol. 25, No. 8 IEEE Communications Magazine).*

"Integrated maintenance management for communication networks—an AT&T solution" (John, T.C.; Dome, G.J.; Global Telecommunications Conference, 1991. GLOBECOM '91. Countdown to the New Millennium. Featuring a Mini-Theme on: Personal Communications Services, vol., No., pp. 654-657 vol. 1, Dec. 2-5, 1991).*

Enterprise Facility Information Systems, EnFlex Corp. Dec. 2003.*

* cited by examiner

| Wire Center Rank | Location | "Dry Days" | "Dry Day" Trouble Tickets | "Dry Day" Average | "Rainy Days" | "Rainy Day" Trouble Tickets | "Rainy Day" Average | Percent Increase |
|---|---|---|---|---|---|---|---|---|
| 1 | Location 1 | 351 | 328 | 0.93 | 42 | 148 | 3.52 | 277.09 |
| 2 | Location 2 | 364 | 301 | 0.83 | 30 | 88 | 2.93 | 254.73 |
| 3 | Location 3 | 357 | 491 | 1.38 | 37 | 180 | 4.86 | 253.72 |
| 4 | Location 4 | 358 | 244 | 0.68 | 35 | 86 | 2.39 | 250.50 |
| 5 | Location 5 | 357 | 445 | 1.25 | 37 | 160 | 4.32 | 246.92 |
| 6 | Location 6 | 357 | 622 | 1.74 | 37 | 209 | 5.65 | 224.21 |
| 7 | Location 7 | 358 | 895 | 2.5 | 35 | 291 | 8.08 | 223.33 |
| . . . | . . . | . . . | . . . | . . . | . . . | . . . | . . . | . . . |
| N | Location N | 358 | 1171 | 3.27 | 35 | 327 | 9.08 | 177.70 |

SYSTEM AND METHOD FOR PROVIDING FACILITIES MANAGEMENT BASED ON WEATHER VULNERABILITY

BACKGROUND INFORMATION

Modern communication networks are increasing in size and complexity. However, many of these networks are built upon legacy point-to-point connections fixed across transmission mediums, such as twisted pair, fiber optic, coax, and the like. It is well known that these physical facilities deteriorate with time and exposure to environmental conditions, including humidity, precipitation, solar radiation, temperature, etc. As such, network service providers typically engage in preventative maintenance in order to thwart network outages, as well as continually provide superior service to the customer. In fact, given the highly competitive nature of, for instance, the telecommunications industry, ensuring customers receive the highest quality, most reliable voice, data, and video services is developing into a vital aspect of business operations. In many instances, the impact of network failures, even if evanescent, can cause a substantial decline in profit attributable to customer migration alone.

Consequently, the ability to identify and remedy facility vulnerability failures (i.e., soft failures—performance degradation) before those faults translate into network downtime (i.e., hard failures—total, or catastrophic, system failure) is critical to helping companies attain their business objectives. Given the prevalence of modern networks, however, it is becoming ever more challenging for service providers to monitor, identify, and prioritize facility vulnerabilities within the network infrastructure, so as to initiate preventative maintenance activities, particularly because of budgetary constraints.

Therefore, there is a need for an approach that proactively provides preventative maintenance determinations.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENTS

A preferred apparatus, method, and software for identifying and prioritizing facility vulnerabilities based on weather correlated trouble tickets are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
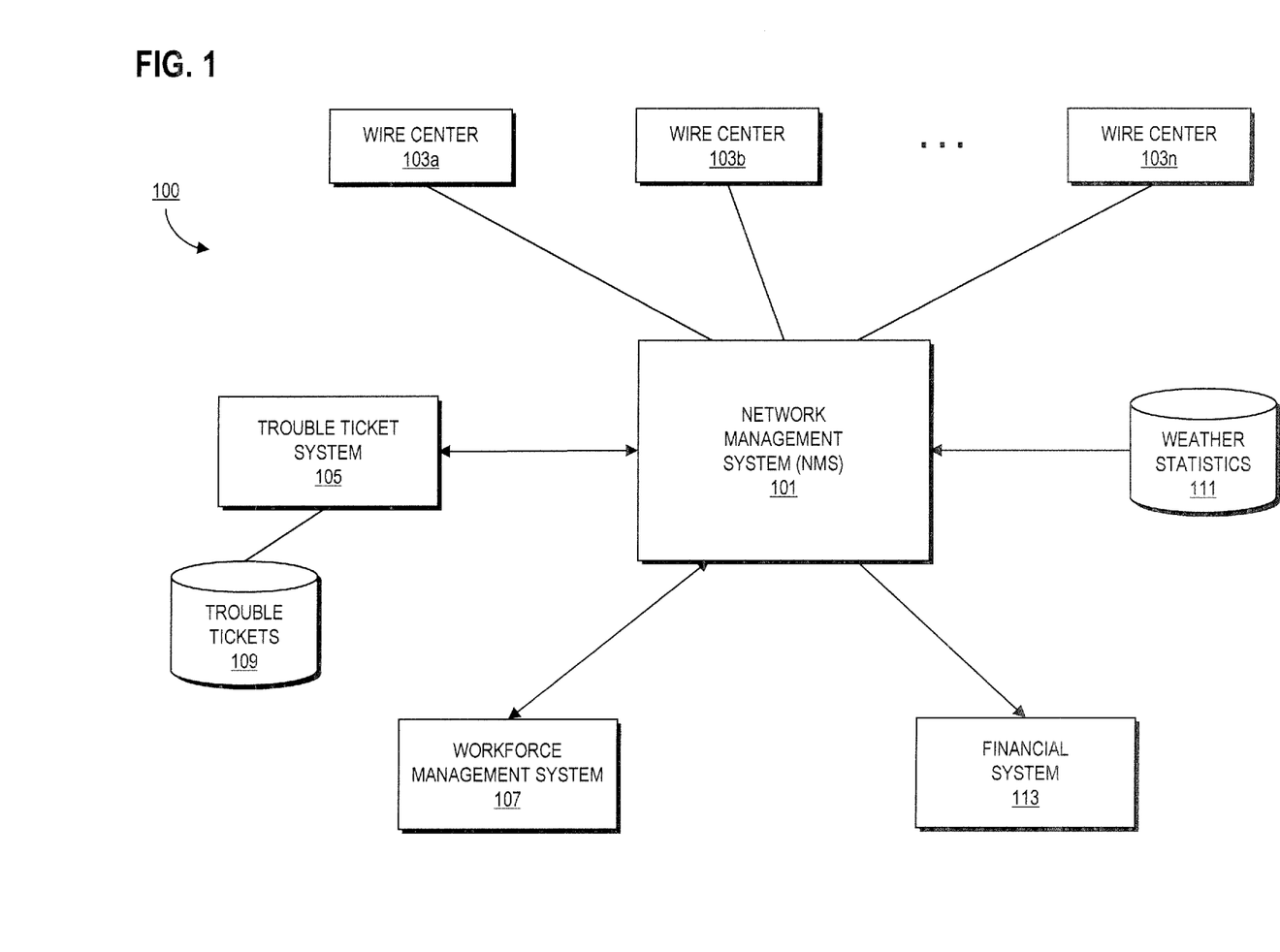
FIG. 1 is a diagram of a system capable of identifying and prioritizing facility vulnerabilities based on weather correlated trouble tickets, according to an exemplary embodiment.

FIG. 1 is a diagram of a system capable of identifying and prioritizing facility vulnerabilities based on weather correlated trouble tickets, according to an exemplary embodiment. For the purposes of illustration, system 100 a network management system (NMS) 101 that is configured to identify and prioritize one or more network facilities (e.g., wire centers 103a-103n) experiencing a high volume of weather correlated trouble tickets, as well as identify and prioritize specific geographic locations serviced by those wire centers 103a-103n to receive preventative maintenance based on information within the trouble tickets. In one embodiment, NMS 101 may be accessible over one or more public or private networks (not shown), such as the Internet. It is contemplated that system 100 may embody many forms and include multiple and/or alternative components and facilities.

It is recognized that environmental conditions, such as humidity, precipitation, and temperature, as well as other ecological stresses, such as solar radiation and wind, degrade network resources (e.g., connectors, switches, terminals, transmission lines, etc.). In fact, the root-cause of many network failures (either soft or hard) is often attributable to weather related occurrences. Not surprisingly, network service providers (e.g., carriers) generally receive an abrupt, if not extreme, increase in trouble ticket volume during weather episodes, such as during rainfall or a snow storm. Therefore, the approach according to certain embodiments stems from the recognition that correlating trouble ticket volume to weather related phenomena (e.g., rainfall) provides an efficient way to identify facility vulnerabilities, as well as prioritize specific geographic locations to receive preventative maintenance and/or network migration. With this information (i.e., risk assessment), network service providers can better allocate scarce preventative maintenance and/or migration funds to avoid later, more catastrophic network failures.

According to one embodiment, NMS 101 is configured as a fault management framework, which identifies, isolates, and prioritizes fault vulnerabilities based on weather correlated trouble tickets in order maintain network operations at (or near) maximum efficiency. In this manner, embodiments of NMS 101 facilitate preventative maintenance and/or network migration determinations concerning the outside plant of a network service provider, such as a voice, data, and/or video carrier. While specific reference is made thereto, it is to be appreciated that embodiments of NMS 101 also find application in preventative maintenance and/or network migration determinations of the inside plant of a network service provider.

By way of example, the outside plant includes the cables, conduits, ducts, poles, and other supporting structures, as well as certain equipment items, such as load coils, repeaters, etc., of a network service provider. In this manner, the outside plant includes the local loops of the carrier, which are the physical connections from one or more customer premises (e.g., residential homes, commercial businesses, etc.) to the points of presence (POP) of the carrier, such as one or more wire centers (e.g., wire centers 103a-103n). It is noted that the local loops may be provided over any suitable transmission medium, including twisted pair, fiber optic, coax, and the like. For example, a local loop of a conventional telephone system may comprise a twisted pair (or pairs) that connect(s) a demarcation point (e.g., a distribution frame, a cable head, etc.) of a customer premise to an edge (e.g., a circuit switch) of a local exchange carrier (LEC) wire center, such as wire center 103a. In this manner, the outside plant is naturally exposed to environmental conditions. As such, NMS 101 is configured to identify and prioritize wire centers 103a-103n to receive preventative maintenance "now" based on weather correlated trouble tickets, in order to avoid catastrophic network failures "later." According to other embodiments, NMS 101 specifically targets, i.e., isolates, geographic locations serviced by wire centers 103a-103n that require inspection, preventative maintenance, and/or network migration procedures.

In one implementation, NMS 101 communicates with a trouble ticket system 105, either directly or via one or more networks, to identify and prioritize wire centers (e.g., wire centers 103a-103n) that are fault vulnerable, i.e., require inspection, preventative maintenance, and/or network migration procedures. According to one embodiment, the identification and prioritization of wire centers 103a-103n is based on weather correlated trouble tickets. As is well known, trouble tickets are utilized by carriers to document reported network problems and/or error detection notifications. As such, trouble ticket system 105 is configured to accept reports from internal resources (e.g., technicians, system fault analyzers, etc.), as well as from external resources (e.g., customers) regarding network performance, i.e., service(s) of the service provider, to generate one or more trouble tickets. Alternatively, trouble ticket system 105 may accept trouble tickets generated by the internal or external resources and/or modifications thereto. Thus, trouble ticket system 105 is configured to support fault isolation and network resolution by providing NMS 101 with a unified view of network problems via trouble tickets.

Trouble ticket system 105 may be implemented as any suitable interface, such as a conventional call center, an interactive voice response (IVR) unit, a web-based graphical user interface (GUI), and/or any other equivalent interface, for generating and/or receiving trouble tickets. For instance, a customer may initiate a communication session with an IVR implementation of trouble ticket system 105 via a plain old telephone service device and provide verbal input concerning a problem the customer is experiencing, such as a loss of network connectivity. In response, trouble ticket system 105 may generate an electronic record, i.e., a trouble ticket, documenting the problem, as well as append to the record other information, such as customer demographic information. Trouble ticket system 105 may also include a workflow engine that creates trouble tickets based on network alarms, generated at, for instance, a real-time network monitor (not illustrated) that provides intelligent circuit and element testing data associated with fault detection and isolation. The real-time network monitor may further provide network topology information, real-time statistics, and intrusive test results. As such, trouble ticket system 105 may include this additional information in a trouble ticket. Further, trouble ticket system 105 may also receive and/or track trouble ticket status messages, such as a current stage of trouble ticket investigation or trouble ticket resolution, generated by a workforce management system 107, and include this information in a trouble ticket.

Thus, by way of example, trouble ticket system 105 can generate trouble tickets including data, such as customer names, telephone numbers, addresses, narratives of the problems, hardware/software affected, related device addresses, fault analysis, network performance, real-time statistics, symptom codes, intrusive test results, severities, statuses, and/or any other suitable information, such as dates, times, reference numbers, related network topology, etc. According to one embodiment, trouble ticket system 105 structures or compartmentalizes this trouble ticket information into fields, tables, or any other suitable data structure, such as a delimited text file. For example, a trouble ticket data structure may include columns and rows that correspond to particular data fields and data entries, respectively. In any case, a data structure may be propagated with data entries corresponding to the trouble ticket information for the purpose of forming an automated prioritization report, or parts thereof. Alternatively, data structures may be generated automatically. It is noted that the aforementioned data structures are merely exemplary and are not intended to limit the nature or structure of a data source that may be utilized by NMS 101.

According to particular embodiments, trouble ticket system 105 stores generated and/or received trouble tickets at a local and/or a remote trouble ticket repository 109. Additionally (or alternatively), trouble tickets may be stored to a memory of trouble ticket system 105 and/or transmitted to NMS 101. As such, trouble ticket system 105 also includes a communication interface (not shown) configured to transmit trouble tickets to NMS 101, either "on-demand" or as the result of a predefined schedule, such as periodically, e.g., after a selected time period. NMS 101 may in turn include received trouble ticket information (or parse trouble tickets for particular information), which then may be ported into an application, data store, module, etc., such as a prioritization report or mapping application.

In one embodiment, NMS 101 may correlate trouble ticket information (e.g., date, time, and geographic location entries) with weather statistics to identify and prioritize fault vulnerabilities. As such, NMS 101 may communicate with, either directly or via one or more networks, a weather statistics repository 111 (hereinafter "repository 111"). In one embodiment, repository 111 is owned and operated by a third party, such as the National Weather Service. According to other embodiments, repository 111 is owned and operated by a network service provider. Repository 111 may include weather statistics, such as governing location, date, time, and forecast, including high/low temperatures and sky conditions, e.g., cloud cover, cloud deck, and precipitation. In other embodiments, humidity, wind velocity, wind gust, dew point, pressure, visibility, smog, air pollution, ultraviolet rating, ceiling, tide level, water/surf condition, and/or the like, may be stored within repository 111, as well as other suitable meteorological, hydrological, climatological, and/or geophysical information. As such, NMS 101 may receive suitable weather statistics to correlate trouble tickets with particular weather phenomena.

As quality handling of network problems also generally entails a workforce, system 100 also includes workforce management system 107 in communication with NMS 101, either directly or via one or more networks. The system 107 is configured to automate the management of maintenance and repair services that are performed in response to output from NMS 101, as well as trouble ticket system 105. The output may include particular trouble tickets requiring resolution, a prioritization schedule for conducting preventative maintenance, a regional map of a wire center (e.g., wire center 103a) including overlay information, such as a geographic plotting of weather correlated trouble tickets, etc. Further, workforce management system 107 is configured to push (either automatically or in response to a request) certain status information to NMS 101 and/or trouble ticket system 105 upon the occurrence of a status change to a trouble ticket, preventative maintenance schedule, etc. For example, a completed preventative maintenance or repair procedure may warrant a status update message. As previously mentioned, this status information can be appended to one or more trouble tickets. In turn, NMS 101 may dynamically reprioritize a preventative maintenance schedule based on weather correlated trouble tickets and/or the status information provided by workforce management system 107.

System 100 may also include a financial system 113 for controlling investigation, preventive maintenance, and/or network migration operations efficiently and effectively based on a monetary schedule, such as a policy within an annual budget of a network service provider. In essence, financial system 113 provides accurate and cost-effective stewardship of the assets and resources of a service provider, such as the availability of a workforce or cost-effectiveness of preventative maintenance versus network migration. In turn, financial system 113 may utilize output from NMS 101, e.g., a prioritized preventative maintenance schedule, to create subsequent annual budgets, including budgeting for preventative maintenance and/or network migration operations. As such, financial system 113 utilizes the output of NMS 101 to reduce the risk of a service provider over-spending, as well as ensuring a revenue stream is available to cover operational costs.

Figure 2:
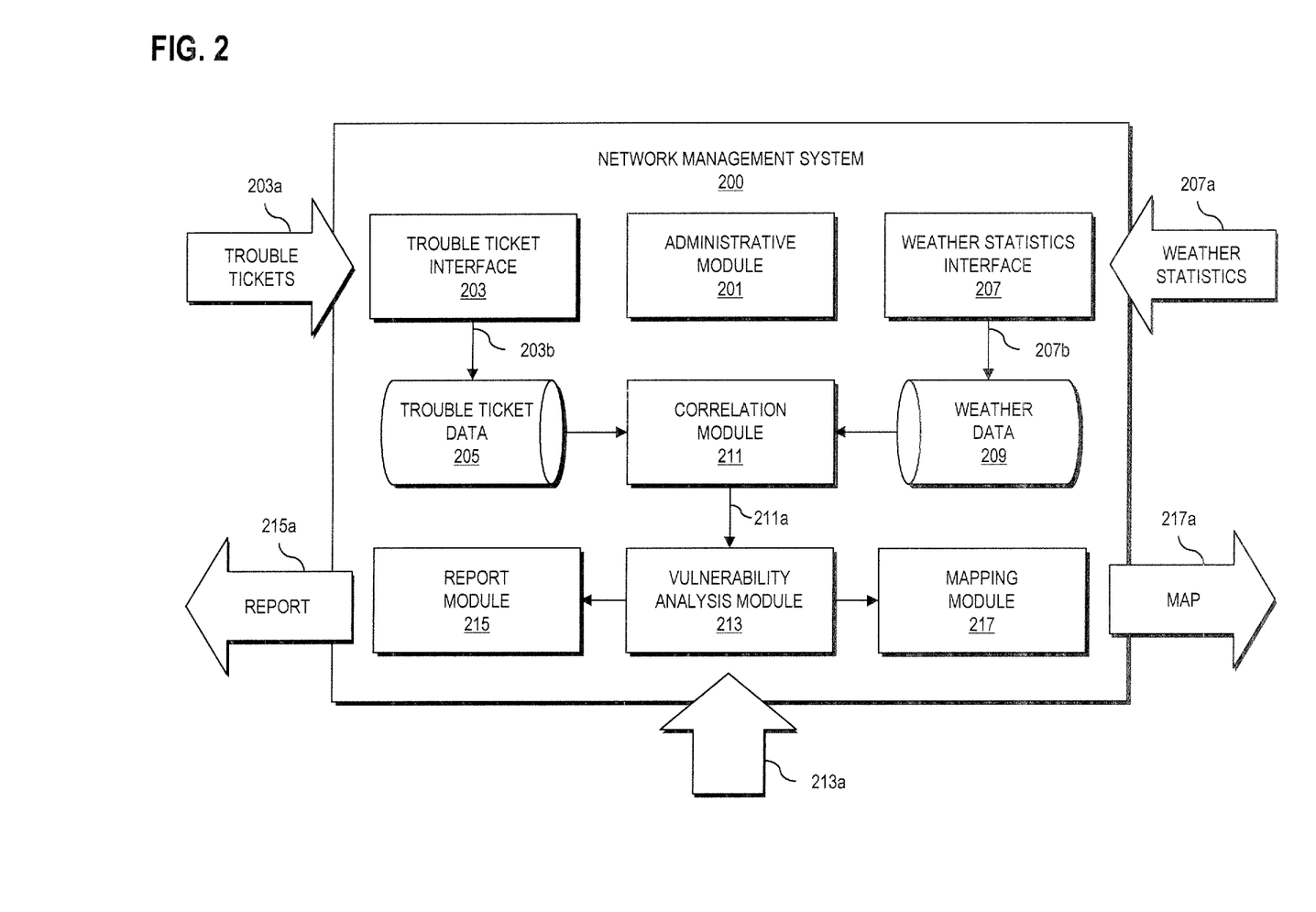
FIG. 2 is a diagram of a network management system configured to identify and prioritize facility vulnerabilities based on weather correlated trouble tickets, according to an exemplary embodiment.

FIG. 2 is a diagram of a network management system configured to identify and prioritize facility vulnerabilities, according to an exemplary embodiment. By way of example, NMS 200 may comprise computing hardware (such as described with respect to FIG. 5), as well as include additional components configured to execute the processes described herein. As such, NMS 200 may be implemented as a rule-based system that utilizes rule-based business logic to obtain, correlate, and analyze trouble tickets according to weather phenomena. In other embodiments, NMS 200 may utilize rule-based business logic to identify and prioritize wire centers (e.g., wire centers 103a-103n) based on the weather correlated trouble tickets, as well as identify and prioritize specific geographic locations serviced by wire centers 103a-103n requiring inspection, preventative maintenance, and/or network migration procedures. The identification and prioritization of specific geographic locations may be based on the topological clustering of weather correlated trouble tickets. In the depicted embodiment, NMS 200 includes an administrative module 201, a trouble ticket interface 203, a trouble ticket data repository 205, a weather statistics interface 207, a weather repository 209, a correlation module 211, a vulnerability analysis module 213, a report module 215, and a mapping module 217. It is contemplated, however, that NMS 200 may embody many forms and include multiple and/or alternative components.

Administrative module 201 provides NMS 200 administration. In one embodiment, a network administrator utilizes administrative module 201 to establish and define one or more governing parameters controlling the operations of NMS 200. For instance, administrative module 201 may be used to define an identification and prioritization methodology to rank wire centers (e.g., wire centers 103a-103n) in terms of fault vulnerability utilizing a common denominator. According to one embodiment, the common denominator is defined as a comparison between (e.g., a percentage increase in) trouble ticket volumes for a wire center (e.g., wire center 103a) generated and/or received by trouble ticket system 105 during time periods (e.g., days) with and without weather-related occurrences (e.g., measurable precipitation). It is noted that precipitation in general, and rainfall in particular, is a catalyst that reveals non-uniform outside plant problems, such as opens, intermittent connections, questionable terminals, etc., that are not, for the most part, apparent during "business-as-usual" conditions. Thus, with respect to rainfall, conducting the aforementioned comparison can provide network service providers a proportional measure of the vulnerability of a wire center, or the components of the local loops of the wire center, to faults. For the purposes of explanation, the comparison is termed "rainfall vulnerability" and is defined as follows:

$$RV = \left( \frac{\left(\frac{RDTT}{RD}\right) - \left(\frac{DDTT}{DD}\right)}{\frac{DDTT}{DD}} \right) * 100 \quad \text{Equation (1)}$$

where:

$RV$ = "Rainfall Vulnerability" of a Wire Center $\frac{RDTT}{RD}$ = Average Number of "Rainy Day" Correlated Trouble Tickets $\frac{DDTT}{DD}$ = Average Number of "Dry Day" Correlated Trouble Tickets $RDTT$ = Number of "Rainy Day" Correlated Trouble Tickets $RD$ = Number of "Rain Days"

$DDTT$ = Number of "Dry Day" Correlated Trouble Tickets $DD$ = Number of "Dry Days"

Equation (1) yields the percentage increase in wire center trouble tickets per day from days without rainfall to wire center trouble tickets per day during days with rainfall. Using this factor, NMS 200 may identify and prioritize wire centers (e.g., wire centers 103a-103n) that are fault vulnerable based on a proportional measure of "rainfall vulnerability" of each of the wire centers 103a-103n. In this manner, NMS 200 may further geographically map the rainfall correlated trouble tickets of select wire centers (e.g., the most "rainfall vulnerable") for identifying and prioritizing specific geographic locations serviced by wire centers 103a-103n requiring inspection, preventative maintenance, and/or network migration.

Accordingly, NMS 200 includes trouble ticket interface 203 and weather statistics interface 207 for obtaining (or receiving) trouble tickets 203a and weather statistics 207a, respectively. Trouble tickets 203a may be acquired from trouble ticket repository 109 via trouble ticket system 105, while weather statistics 207a may be acquired from weather statistics repository 111. Trouble tickets 203a and weather statistics 207a may be received in real-time, i.e., as generated, or in an "on-demand" fashion, e.g., after a predetermined time period, such as a preceding number of days, months, years, etc. It is noted that trouble ticket interface 203 may "read/scan" trouble tickets 203a for a symptom code in order to "discard" trouble tickets exhibiting codes not reflective of outside plant fault vulnerability, such as cable cuts, etc. In certain embodiments, trouble ticket interface 203 and/or weather statistics interface 207 may parse trouble tickets 203a and/or weather statistics 207a, respectively, for select data fields and/or entries. For instance, trouble tickets 203a may be parsed for a reporting date and time, as well as a reporting location (e.g., customer address), while weather statistics 207a may be parsed for select weather conditions (e.g., rainfall), as well as associated dates, times, and geographic locations. It is contemplated, however, that additional or alternative information may be parsed from trouble tickets 203a and/or weather statistics 207a.

As such, the parsed information, i.e., trouble ticket data 203b and weather data 207b, can be stored in (or to) trouble ticket data repository 205 and weather data repository 209, respectively. In alternative embodiments, a single repository or a memory (not illustrated) of NMS 200 may be provided for storing this information. According to other embodiments, trouble ticket interface 203 and/or weather statistics interface 207 may be configured to receive trouble ticket data 203b and/or weather data 207b directly from, for example, trouble ticket system 105 and/or weather statistics repository 111, respectively. In other embodiments, trouble ticket interface 203 and weather statistics interface 207 comprise logical components of a communication interface (not illustrated).

Correlation module 211 may be provided to correlate trouble ticket data 203b with weather data 207b. That is, correlation module 211 is configured to compare a date, time, and/or geographic location field of trouble ticket data 203b and weather data 207b to segregate trouble ticket data 203b into "dry day" trouble ticket data and "rainy day" trouble ticket data. In this manner, "rainy days" and "dry days" correspond to days with and without measurable precipitation, e.g., rainfall. Further, correlation module 211 may determine a total number of "dry days" and "rainy days" based on a predetermined time period, such as the predetermined time period for obtaining (or receiving) trouble tickets 203a and/or weather statistics 207a. In this manner, those days not defined as "rainy days" are defined as "dry days," and vice versa. Alternatively, the total number of "dry days" and "rainy days" may be determined or parsed from weather statistics 207a by, for example, weather statistics interface 207. For the purposes of explanation, the aggregate output of correlation module 211 is defined as weather correlated trouble tickets 211a (hereinafter "data 211a").

According to another embodiment, correlation module 211 may statistically define "dry days" and "rainy days." Namely, correlation module 211 can fit one or more statistical models, such as multimodal distributions, to daily ticket volumes for each wire center 103a-103n. In this manner, correlation module 211 may determine "ticket volume spikes" by calculating one or more standardized differences between actual daily ticket volumes and volumes predicted by the one or more statistical models. Utilizing the "ticket volume spikes" correlation module 211 may define "rainy days" as the days included within a statistically significant percentage of the "largest" magnitudes of the "ticket volume spikes." For example, "rainy days" may be defined as the days exhibiting "ticket volume spikes" having magnitudes within, e.g., the top 5%-15%. It is noted that the statistically significant percentage may be determined empirically in order to avoid including days with a "small" amount of precipitation in arid locations as "rainy days," while also avoiding a "rainy day" definition that over-emphases a "very large" amount of precipitation requirement. In certain embodiments, correlation module 211 may perform a consistency check against "rainy day" definitions by comparing daily ticket volumes against precipitation amounts parsed from weather statistics 207a. In this way, "rainy days" can be defined to include high ticket volume days that are aftermaths (or a consequence) of rain, but are not necessarily rainy themselves.

In particular embodiments, correlation module 211 may port data 211a to a correlation repository or memory (not illustrated), which is particularly useful in situations when NMS 200 obtains (or receives) trouble tickets 203a in real-time, but does not provide a vulnerability analysis until after a predetermined time period, e.g., a certain number of days, months, years, etc. of trouble ticket 203a collection. Alternatively (or additionally), correlation module 211 may port data 211a to vulnerability analysis module 213 for analysis, i.e., identification and prioritization of facility vulnerabilities.

Vulnerability analysis module 213 is configured to implement the wire center ranking methodology established and defined by a network administrator utilizing administrative module 201. Namely, vulnerability analysis module 213 performs a common denominator comparison of wire centers 103a-103n utilizing data 211a to determine a relative fault vulnerability state of wire centers 103a-103n. That is, vulnerability analysis module 213 calculates an average number of "dry day" correlated trouble tickets and an average number of "rainy day" correlated trouble tickets, from which a rainfall vulnerability calculation may be performed for wire centers 103a-103n. The associated rainfall vulnerability calculations may be utilized by vulnerability analysis module 213 to rank wire centers 103a-103n, the rank being relatively proportional to the fault vulnerability of wire centers 103a-103n. The module 213 may utilize a report module 215 for generating reports, such as a spreadsheet, graph, chart, etc., that visually present the fault vulnerability rank of wire centers 103a-103n.

The analysis module 213 may also utilize a mapping module 217 to graphically plot "rainy day" correlated trouble tickets on a map (e.g., overlay objects on a digital map corresponding to "rainy day" trouble tickets) via the reporting locations of the trouble ticket, e.g., customer addresses. In other embodiments, vulnerability analysis module 213 may also plot (e.g., overlay) "dry day" correlated trouble tickets on the map. Accordingly, the plotting points (e.g., overlay objects) may be distinguished according to size, shape, color, and outline, as well as any other suitable configuration parameter. For example, circular objects may be utilized to designate trouble tickets corresponding to "rainy days," while triangular objects may be utilized to designate trouble tickets corresponding to "dry days." In turn, the circular and/or triangular objects may be color-coded to correspond to the date and/or time when the trouble tickets were reported. For instance, the objects may be color-coded to the quarters of a year, wherein a first through fourth color-code correlates to the first through fourth quarters of a reporting year. The outline of the objects may be utilized to distinguish the trouble tickets of one wire center versus another wire center, while an object size may be utilized to convey a trouble ticket severity. It is noted that the aforementioned configurations are merely exemplary in nature and are not intended to limit embodiments of NMS 200.

The plotting functions of vulnerability analysis module 213 and/or mapping module 217 may be performed for each wire center (e.g., wire centers 103a-103n) and/or for select wire centers based on the relative ranks of wire centers 103a-103n. The clustering of plotting points may be utilized by vulnerability analysis module 213 and/or network administrators to identify and prioritize specific geographic locations serviced by wire centers 103a-103n to be inspected and/or to receive preventative maintenance and/or network migration procedures. As such, the configurable features of the plotting points (or objects) enable the trouble ticket clusters to be analyzed and/or distinguished based on wire center, date/time, "rainy day/dry day" correlation, severity, or any other suitable parameter. In certain embodiments, the clustered tickets may be prioritized by the time scope of their component's troubles, their recency or their occurrence rates.

In certain embodiments, vulnerability analysis module 213 may also utilize input 213a from workforce management system 107 and/or financial system 113 to further prioritize and/or schedule inspection, preventative maintenance, and/or network migration procedures. For instance, vulnerability analysis module 213 may obtain (or receive), via a communication interface (not illustrated) a workforce availability from workforce management system 107 for prioritizing the scheduling of preventative maintenance procedures. In another example, vulnerability analysis module 213 may obtain (or receive), via the communication interface, an annual budget to efficiently allocate funds within the confines of the assets and resources of a service provider.

Accordingly, NMS 200 facilitates the identification and prioritization of facility vulnerabilities.

Figure 3A:
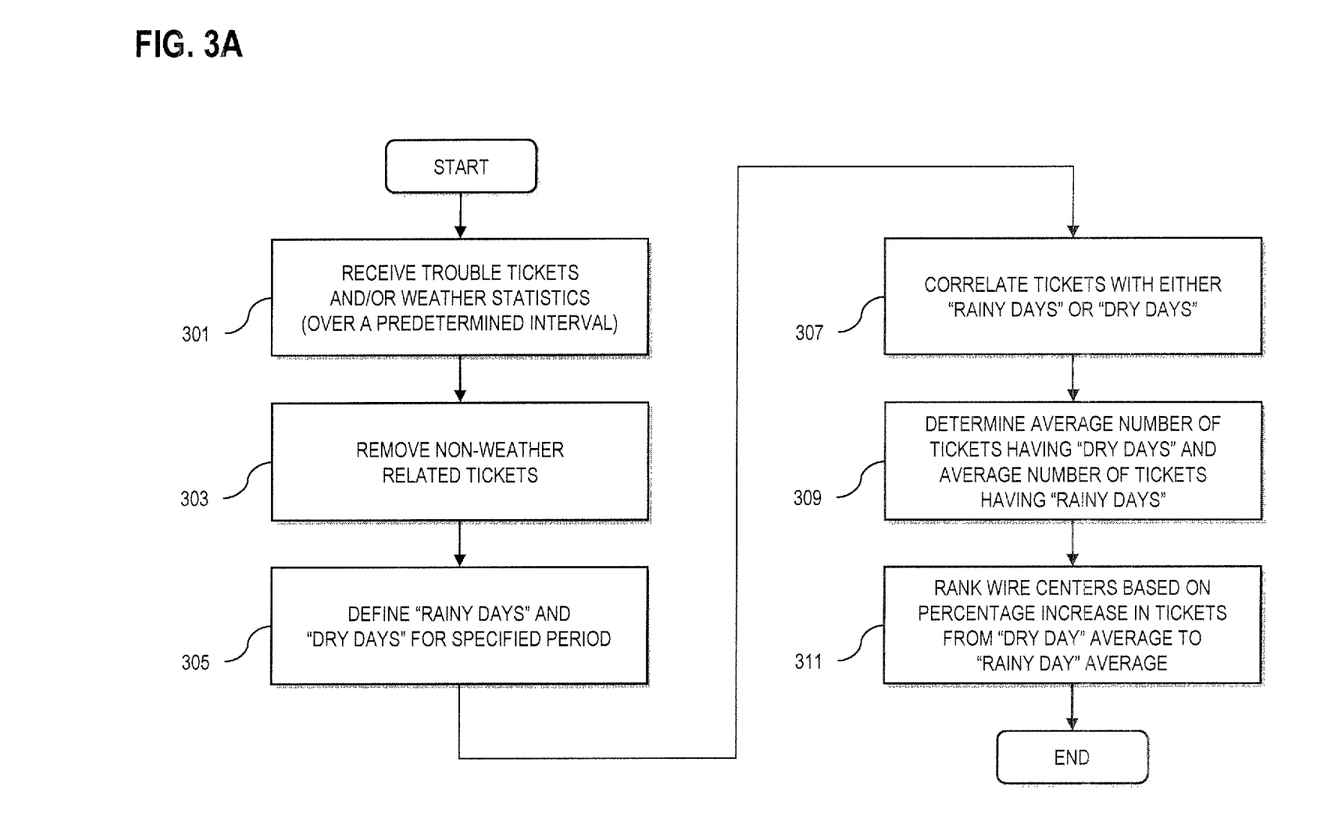
FIGS. 3A and 3B are, respectively, a flowchart of a vulnerability identification and prioritization process, and a diagram of an exemplary prioritization report utilized in the process of FIG. 3A, according to various embodiments.
Figure 3B:
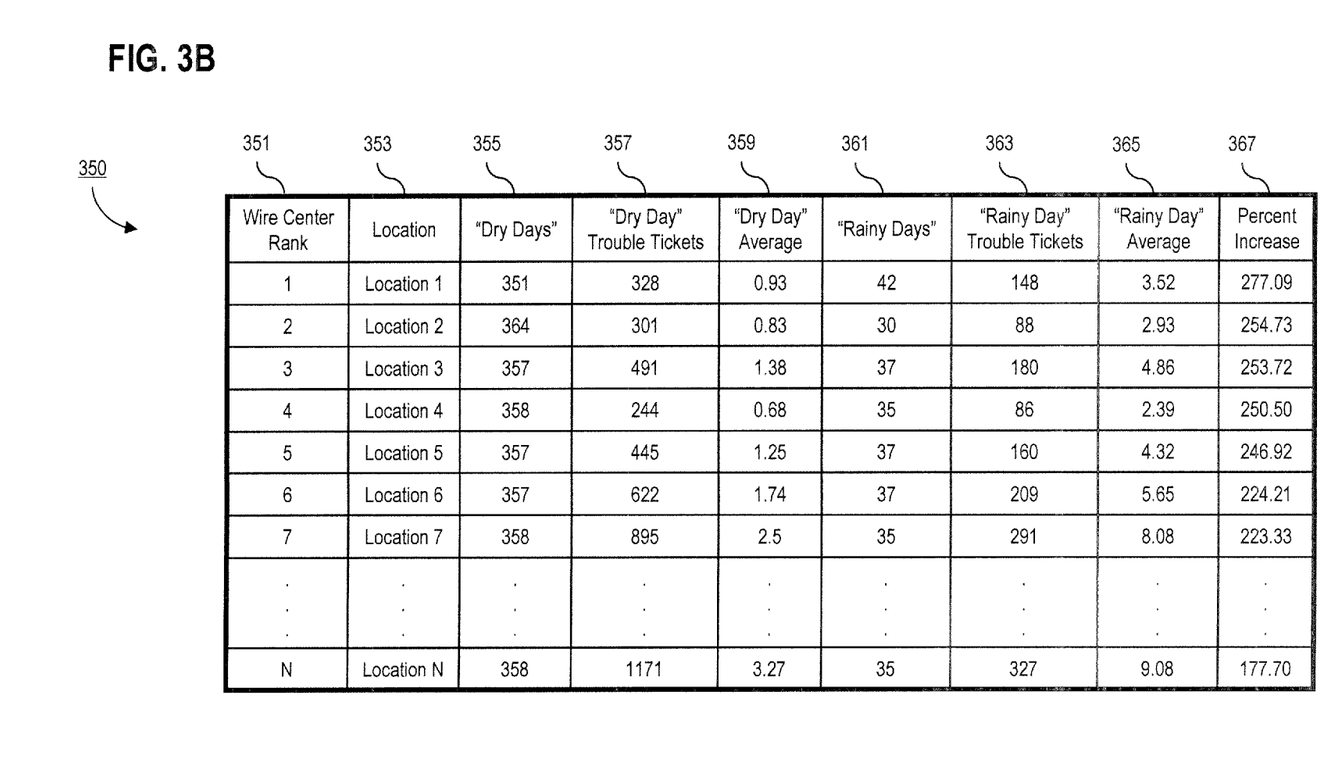

FIGS. 3A and 3B are, respectively, a flowchart of a vulnerability identification and prioritization process, and a diagram of an exemplary prioritization report utilized in the process of FIG. 3A, according to various embodiments. For the purposes of explanation, the trouble tickets relate to such facilities as wire centers 103a-103n. At step 301, NMS 200 receives one or more trouble tickets 203a concerning one or more wire centers 103a-103n from trouble ticket system 105 via trouble ticket interface 203. Further, NMS 200 may receive weather information (e.g., weather statistics 207a) from weather statistics repository 111 via weather statistics interface 207. Trouble tickets 203a and/or weather statistics 207a may be received in real-time or in an "on-demand" fashion. As such, trouble tickets 203a and/or weather statistics 207a may be acquired over (or after) a predetermined time interval, such as a certain number of days, months, years, etc.

Per step 303, trouble ticket interface 203 may "read" trouble tickets 203a for a symptom code in order to "discard" or "remove" trouble tickets exhibiting codes not reflective of an outside plant weather-related vulnerability, such as a cable cut. In addition, trouble ticket interface 203 and/or weather statistics interface 207 may parse trouble tickets 203a and/or weather statistics 207a for associated dates, times, and locations, as well as weather-related conditions (e.g., precipitation) in the case of weather statistics 207a. The parsed data, i.e., trouble ticket data 203b and/or weather data 207b, can be stored in (or to) trouble ticket data repository 205 and weather data repository 209, respectively. In alternative embodiments, data 203b and/or data 207b may be stored in (or on) a memory of NMS 200, and/or directly ported to correlation module 211.

In step 305, correlation module 211 defines weather events—e.g., "rainy days" and "dry days"—for a specified period, such as the predetermined time interval of step 301. The definition of "rainy days" and "dry days" may be statistically established and, in certain embodiments, checked for consistency against weather statistics 207a and/or parsed weather data 207b, as previously mentioned. In alternative embodiments, the definition of "rainy days" and "dry days" may be established as a result of correlating trouble tickets with weather phenomena. As such, correlation module 211 correlates trouble ticket data 203b with weather data 207b, per step 307. Namely, correlation module 211 compares a date, time, and/or geographic location field of trouble ticket data 203b and weather data 207b to segregate trouble ticket data 203b into "dry day" trouble ticket data and "rainy day" trouble ticket data. In this manner, "rainy days" and "dry days" may be defined and corresponded to days with and without measurable precipitation, e.g., rainfall. Correlation module 211 also determines a total number of "dry days" and "rainy days" based on the predetermined time interval and "rainy day/dry day" definition. An output 211a of correlation module 211 may be stored in (or to) a correlation repository or memory. Alternatively (or additionally), correlation module 211 may port data 211a to vulnerability analysis module 213 for analysis, i.e., identification and prioritization of facility vulnerabilities.

In step 309, vulnerability analysis module 213 calculates an average number of "dry day" correlated trouble tickets and an average number of "rainy day" correlated trouble tickets for wire centers 103a-103n. Per step 311, vulnerability analysis module 213 and/or report module 215 ranks wire centers 103a-103n based on a percentage increase calculation in trouble tickets from the "dry day" average to the "rainy day" average. In certain embodiments, report module 215 generates a report, such as exemplary spreadsheet 350 illustrated in FIG. 3B.

By way of example, report 350 provides fields for a wire center rank 351, a wire center location 353, a total number of "dry days" 355, a total number of "dry day" correlated trouble tickets 357, a "dry day" average number of trouble tickets 359, a total number of "rainy days" 361, a total number of "rainy day" correlated trouble tickets 363, a "rainy day" average number of trouble tickets 365, and a percentage increase in trouble tickets from the "dry day" average to the "rainy day" average 367. In this manner, report 350 may be utilized by a network administrator to prioritize inspection, preventative maintenance, and/or network migration funds for wire centers 103a-103n.

Figure 4:
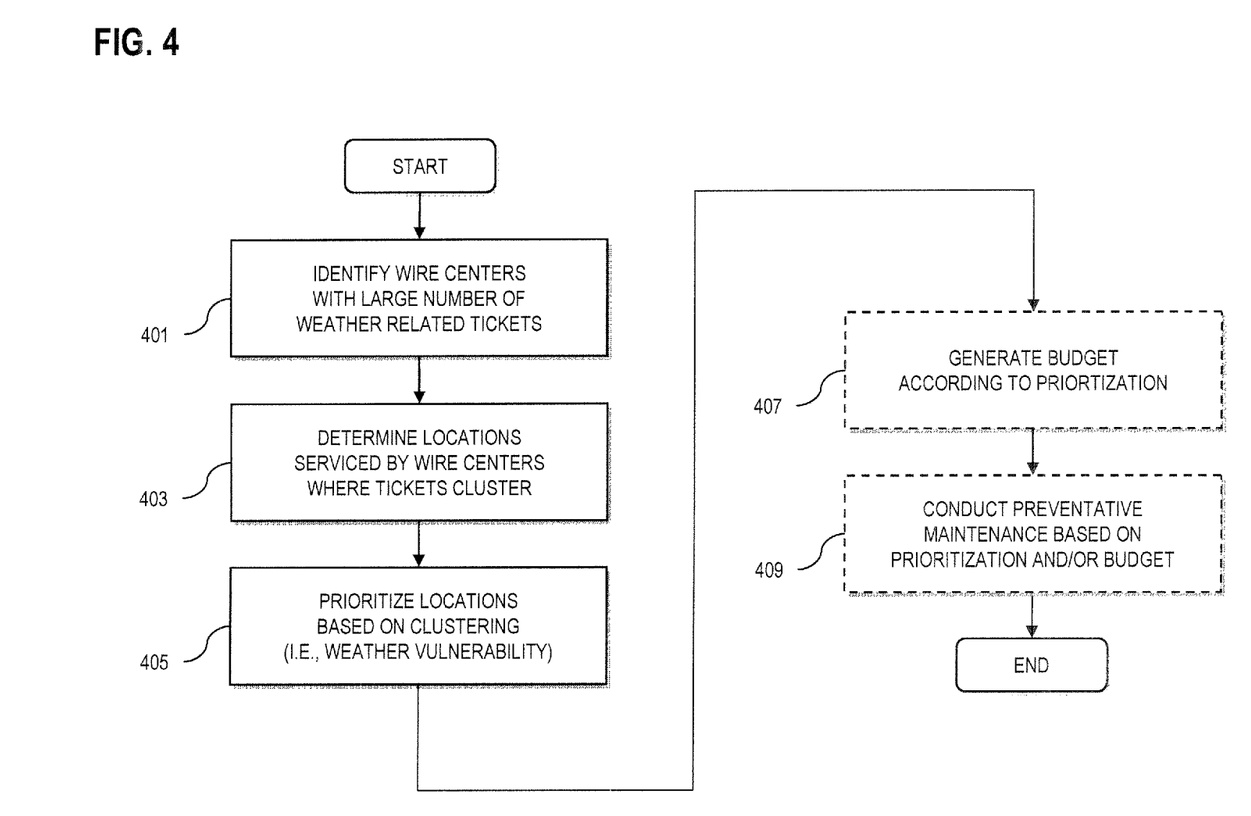
FIG. 4 is a flowchart of a specific location vulnerability identification and prioritization process, according to an exemplary embodiment.

NMS 200 also facilitates the identification and prioritization of specific geographic locations exhibiting facility vulnerabilities. FIG. 4 is a flowchart of a specific location vulnerability identification and prioritization process, according to an exemplary embodiment. At step 401, vulnerability analysis module 213 identifies wire centers with a "large" number of weather related trouble tickets, such as by the process of FIG. 3A. As such, "large" may be defined as a certain absolute number of weather related trouble tickets, or may be a predetermined percentage increase in trouble tickets from non-weather related trouble tickets to weather related trouble tickets. In other embodiments, "large" may be a statistically significant subset of the highest ranked wire centers based on a fault vulnerability analysis, such as a "rainfall vulnerability" analysis.

Per step 403, vulnerability analysis module 213 selects via, for example, input 213a from a network administrator, particular wire centers (e.g., wire centers 103a and 103b) for further analysis, i.e., for identifying specific geographic locations serviced by those wire centers that are fault vulnerable. In particular embodiments, vulnerability analysis module 213 analyzes certain (or all) wire centers 103a-103n based on the definition of a "large" number of weather related trouble tickets. As such, vulnerability analysis module 213 and/or mapping module 217 may be utilized to graphically plot weather related trouble tickets on a map (e.g., overlay objects on a digital map corresponding to the weather-related trouble tickets). This may be accomplished using a reporting location, e.g., a customer address, of the weather related trouble tickets. As previously described, the plotting points (e.g. overlay objects) may be distinguished utilizing overlay objects of various sizes, shapes, colors, outlines, etc. In this manner, vulnerability analysis module 213 may determine where the weather related trouble tickets cluster, i.e., specific locations that are fault vulnerable. According to other embodiments, NMS 200 via, for example, mapping module 217 may output a visual map 217a for analysis by a network administrator and/or any other trained technician.

Once the specific geographic locations are identified, vulnerability analysis module 213, the network administrator and/or the other trained technician may prioritize the identified locations based on the clustering of the weather related trouble tickets, per step 405. After prioritization, the process of FIG. 4A may optionally toggle to step 407 or step 409. In step 407, the prioritization output of step 405 may be transmitted (or otherwise communicated) to financial system 113 to generate a budget according to the output. In step 409, the prioritization output of step 405 and/or the budget output of step 407 may be transmitted (or otherwise communicated) to workforce management system 107 to schedule inspections, preventative maintenance, and/or network migration procedures on the identified and prioritized locations based on the aforementioned outputs.

The processes described herein for identifying and prioritizing facility vulnerabilities based on weather correlated trouble tickets may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
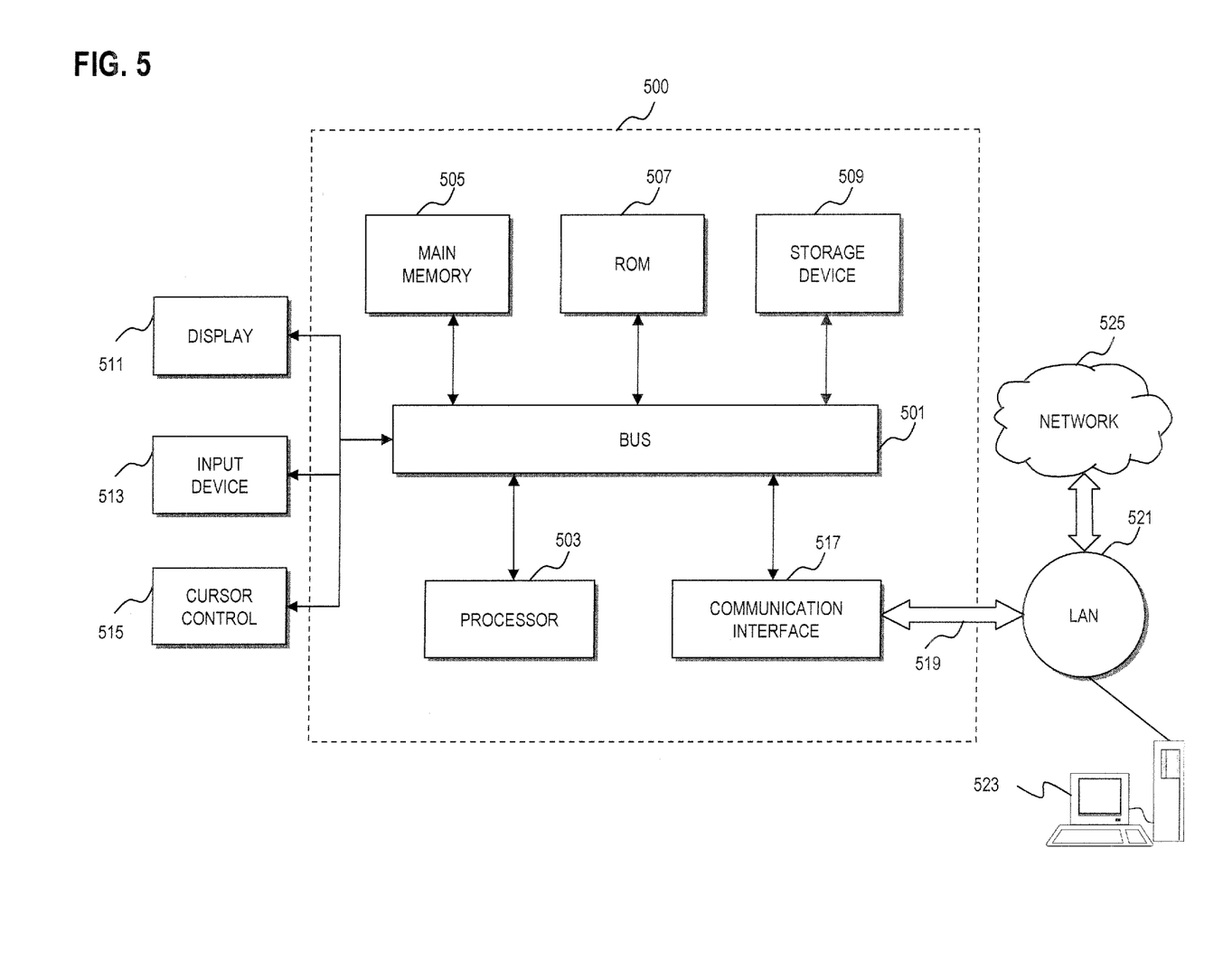
FIG. 5 is a diagram of a computer system that can be used to implement various exemplary embodiments.

FIG. 5 illustrates computing hardware (e.g., computer system) 500 upon which an embodiment according to the invention can be implemented. The computer system 500 includes a bus 501 or other communication mechanism for communicating information and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the invention has been described in connection with a number of embodiments and implementations, the invention is not so limited but covers various obvious modifications and equivalent arrangements.

What is claimed is:

1. A computer-implemented method comprising:
   receiving data representing trouble tickets associated with a plurality of facilities;
   receiving observed weather information relating to the facilities;
   determining, by a processor, vulnerability of the facilities to weather based on the data and the observed weather information;
   prioritizing the facilities based on the determined vulnerability;
   determining vulnerability of geographic locations serviced by a prioritized facility to weather based on the data and the observed weather information;
   prioritizing the geographic locations based on the determined vulnerability of the geographic locations, and
   producing a schedule for one or more of inspection and preventative maintenance for one or more of the facilities and one or more of the geographic locations based on the prioritization of the facilities and the prioritization of the geographic locations.

2. A method according to claim 1, further comprising:
   initiating a preventative maintenance activity for one or more of the facilities and one or more of the geographic locations based on the prioritization of the facilities and the prioritization of the geographic locations.

3. A method according to claim 1, further comprising:
   generating budgetary data for one or more of the facilities based on the prioritization of the facilities.

4. A method according to claim 1, wherein the step of determining vulnerability includes,
   filtering trouble tickets that are non-weather related to yield weather-related trouble tickets,
   correlating each of the weather-related trouble tickets to either a first weather event or a second weather event,
   determining statistical information relating to the first weather event and the second weather event using the correlation, and
   ranking the facilities based on the statistical information.

5. A method according to claim 4, wherein the statistical information includes average number of trouble tickets correlated to the first weather event and average number of trouble tickets correlated to the second weather event.

6. A method according to claim 1, wherein the weather information comprises a location, a date, a time, high and/or low temperatures, and a presence of precipitation.

7. A method according to claim 1, wherein the vulnerability and the prioritizing of the facilities is based on a proportional increase in a number of the trouble tickets stemming from days without rainfall compared to a number of the trouble tickets stemming from days with rainfall.

8. An apparatus comprising:
   one or more interfaces configured to receive data representing trouble tickets associated with a plurality of facilities, and to receive observed weather information relating to the facilities; and
   a processor configured to determine vulnerability of the facilities to weather based on the data and the observed weather information, to prioritize the facilities based on the determined vulnerability, determine vulnerability of geographic locations serviced by a prioritized facility to weather based on the data and the observed weather information, prioritize the geographic locations based on the determined vulnerability of the geographic locations, and produce a schedule for one or more of inspection and preventative maintenance for one or more of the facilities and one or more of the geographic locations based on the prioritization of the facilities and the prioritization of the geographic locations.

9. An apparatus according to claim 8, wherein the processor is further configured to:
   initiate a preventative maintenance activity for one or more of the facilities and one or more of the geographic locations based on the prioritization of the facilities and the prioritization of the geographic locations.

10. An apparatus according to claim 8, wherein budgetary data is generated for one or more of the facilities based on the prioritization of the facilities.

11. An apparatus according to claim 8, wherein the processor is further configured to filter trouble tickets that are non-weather related to yield weather-related trouble tickets, to correlate each of the weather-related trouble tickets to either a first weather event or a second weather event, to determine statistical information relating to the first weather event and the second weather event using the correlation, and to rank the facilities based on the statistical information.

12. An apparatus according to claim 11, wherein the statistical information includes average number of trouble tickets correlated to the first weather event and average number of trouble tickets correlated to the second weather event.

13. An apparatus according to claim 8, wherein the weather information comprises a location, a date, a time, high and/or low temperatures, and a presence of precipitation.

14. An apparatus according to claim 8, wherein the vulnerability and the prioritizing of the facilities is based on a proportional increase in a number of the trouble tickets stemming from days without rainfall compared to a number of the trouble tickets stemming from days with rainfall.

15. A system comprising:
a trouble ticket system including one or more processors configured to store data representing trouble tickets associated with a plurality of facilities; and
a network management system including one or more processors configured to retrieve the stored data from the trouble ticket system and to receive observed weather information relating to the facilities, wherein the network management system includes, a vulnerability analysis module configured to determine vulnerability of the facilities to weather based on the data and the observed weather information, to prioritize the facilities based on the determined vulnerability, to determine vulnerability of geographic locations serviced by a prioritized facility to weather based on the data and the observed weather information, to prioritize the geographic locations based on the determined vulnerability of the geographic locations, and to produce a schedule for one or more of inspection and preventative maintenance for one or more of the facilities and one or more of the geographic locations based on the prioritization of the facilities and the prioritization of the geographic locations.

16. A system according to claim 15, further comprising:
a workforce management system configured to initiate a preventative maintenance activity for one or more of the facilities based on the prioritization of the facilities and one or more of the geographic locations based on the prioritization of the facilities and the prioritization of the geographic locations.

17. A system according to claim 15, further comprising:
a financial system configured to generate budgetary data for one or more of the facilities based on the prioritization of the facilities.

18. A system according to claim 15, wherein the vulnerability analysis module is further configured to perform the steps of:
filtering trouble tickets that are non-weather related to yield weather-related trouble tickets;
correlating each of the weather-related trouble tickets to either a first weather event or a second weather event;
determining statistical information relating to the first weather event and the second weather event using the correlation; and
ranking the facilities based on the statistical information.

19. A system according to claim 18, wherein the statistical information includes average number of trouble tickets correlated to the first weather event and average number of trouble tickets correlated to the second weather event.

20. A system according to claim 15, wherein the weather information comprises a location, a date, a time, high and/or low temperatures, and a presence of precipitation.

21. A system according to claim 15, wherein the vulnerability and the prioritizing of the facilities is based on a proportional increase in a number of the trouble tickets stemming from days without rainfall compared to a number of the trouble tickets stemming from days with rainfall.

* * * * *